US008977595B1

(12) United States Patent
Leonard (10) Patent No.: US 8,977,595 B1
(45) Date of Patent: Mar. 10, 2015

(54) MESSAGE-RECOVERY FILE LOG LOCATING AND MONITORING

(75) Inventor: Mark D. Leonard, Olathe, KS (US)

(73) Assignee: Sprint Communications Company L.P, Overland Park, KS (US)

( * ) Notice: Subject to any disclaimer, the term of this patent is extended or adjusted under 35 U.S.C. 154(b) by 431 days.

(21) Appl. No.: 12/349,558

(22) Filed: Jan. 7, 2009

(51) Int. Cl.
*G06F 7/00* (2006.01)

(52) U.S. Cl.
USPC .......................................................... 707/640

(58) Field of Classification Search
USPC ........... 707/999.001, 999.002, 736, 184, 604, 707/999.101, 999.102
See application file for complete search history.

(56) References Cited

U.S. PATENT DOCUMENTS

| 6,088,659 | A * | 7/2000 | Kelley et al. ................ 702/62 |
| 6,199,068 | B1 * | 3/2001 | Carpenter ........................ 1/1 |
| 6,732,125 | B1 * | 5/2004 | Autrey et al. ................ 707/640 |
| 7,707,184 | B1 * | 4/2010 | Zhang et al. ................ 707/645 |
| 7,778,974 | B2 * | 8/2010 | Compton et al. ............. 707/648 |
| 7,831,561 | B2 * | 11/2010 | Wertheimer et al. ......... 707/640 |
| 7,860,824 | B2 * | 12/2010 | Suzuki et al. ................ 707/609 |
| 7,865,471 | B1 * | 1/2011 | Stagg ........................... 707/640 |
| 7,890,555 | B2 * | 2/2011 | Gunda et al. ................ 707/822 |
| 7,917,536 | B2 * | 3/2011 | Lora et al. .................... 707/802 |
| 8,117,165 | B1 * | 2/2012 | Winckelmann et al. ...... 707/640 |
| 8,180,735 | B2 * | 5/2012 | Ansari et al. ................. 707/640 |
| 8,266,112 | B1 * | 9/2012 | Beatty et al. ................. 707/678 |
| 8,554,733 | B2 * | 10/2013 | Suzuki et al. ................ 707/640 |
| 2005/0138081 | A1 * | 6/2005 | Alshab et al. ................ 707/200 |
| 2005/0273456 | A1 * | 12/2005 | Revanuru et al. ................ 707/1 |
| 2006/0112155 | A1 * | 5/2006 | Earl et al. .................... 707/206 |
| 2006/0123069 | A1 * | 6/2006 | Hickson ....................... 707/205 |
| 2006/0136458 | A1 * | 6/2006 | Elko et al. .................... 707/101 |
| 2008/0243963 | A1 * | 10/2008 | Havewala et al. ............ 707/205 |
| 2008/0270484 | A1 * | 10/2008 | Borkovsky et al. .......... 707/200 |
| 2010/0153474 | A1 * | 6/2010 | Raines et al. ................. 707/812 |

* cited by examiner

*Primary Examiner* — Hosain Alam
*Assistant Examiner* — Eliyah S Harper (57) ABSTRACT

A method, system, and medium are provided for monitoring the data volume in a file log associated with a program (e.g., a queue manager) in a failover computing environment. A failover computing environment includes pairs of programs capable of performing the same functions. One program in the pair is the primary program and the other is the backup program. Only one of the two programs is active at any given time. Embodiments of the present invention may identify the file directory for each program installed on a computing device. The location of each file log may be determined by accessing a core-configuration file in the file directory associated with the program. The program only has access to the core-configuration file when the program is active. Once the file log is located, the file usage may be ascertained and compared with a threshold usage.

19 Claims, 7 Drawing Sheets

MESSAGE-RECOVERY FILE LOG LOCATING AND MONITORING

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, one or more computer-readable media having computer-executable instructions embodied thereon for performing a method of discovering a directory location for a file log associated with a queue manager is provided. The method includes identifying the queue manager, which is installed on a computing device. The method also includes identifying a file directory associated with the queue manager. The method further includes determining the directory location for the file log by parsing a core-configuration file associated with the queue manager. The file log is used by the queue manager to store backup copies of persistent messages, thereby allowing the persistent messages to be recovered. The method also includes determining a file usage for the file log by accessing the file log through the directory location determined from the core-configuration file. The method further includes communicating an alarm when the file usage is greater than a threshold file usage.

In another illustrative embodiment, one or more computer-readable media having computer-executable instructions embodied thereon for performing a method of determining a file usage level of a file log used by a program installed on a computing device is provided. The method includes identifying a file directory associated with a primary program that is one of a plurality of programs installed on the computing device. The primary program is part of a failover cluster that includes at least one pair of programs that are capable of performing the same functions, wherein the at least one pair of programs includes the primary program installed on the computing device and a backup program installed on a different computing device. The backup program is activated when the primary program is deactivated. The at least one pair of programs utilize the file log for backup storage. The method also includes determining a directory location for the file log by parsing a core-configuration file associated with the primary program. The directory location is in a data store that is maintained separately from the computing device and the different computing device. The method also includes determining a file usage for the file log by accessing the file log through the directory location determined from the core-configuration file. The method also includes storing the file usage for the file log.

In a third illustrative embodiment, one or more computer-readable media having computer-executable instructions embodied thereon for performing a method of identifying a directory location for a file log associated with a queue manager is provided. The method includes identifying a file directory for the queue manager installed on a first computing device. The queue manager is part of a failover cluster that includes at least one pair of queue managers capable of performing the same functions. The at least one pair of queue managers includes the queue manager and a backup queue manager installed on a second computing device. The at least one pair of queue managers requires access to a core-configuration file located in a data store to operate. The method also includes determining the directory location for the file log by accessing the core-configuration file. The file log is used by the queue manager to store backup copies of persistent messages, thereby allowing the persistent messages to be recovered. The method also includes determining a file usage for the file log by accessing the file log through the directory location. The method also includes generating an alarm when the file usage is greater than a threshold amount.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the invention generally relate to a method of locating monitoring the usage of a file log. The file log may be shared by two or more queue managers in a failover clustered environment. A failover clustered environment includes a pair of programs capable of performing the same functions. The pair includes a primary program and a backup program. The backup program becomes active only when the primary program fails. A program is active when it is currently tasked with performing a function, regardless of whether the function is actually being performed. In one embodiment, the primary program and the backup program are installed on different computers. The programs may be queue managers that are tasked with managing queues in a messaging-middleware environment. As will be explained in more detail, a queue facilitates the transfer of messages from one program to another by holding the messages for a period of time. The operation of the queues may be managed by queue management software. Queue management software saves a backup of each message designated as persistent in a file log. The file log may be shared by the primary program and the backup program. Further, the file log may be physically located in a data store that is on a different computing device than either the primary program or the backup program. If the file log associated with a queue manager becomes full, the queue manager may begin to experience problems.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

CPU Central Processing Unit
CDMA Code Division Multiple Access
CD-ROM Compact Disk Read Only Memory
DVD Digital Versatile Discs
EEPROM Electrically Erasable Programmable Read Only Memory
GSM Global System for Mobile Communications
IP Internet Protocol
IMS IP Multimedia Subsystem
LAN Local Access Network
LCD Liquid Crystal Display
PDA Personal Digital Assistant
PDSN Packet Data Serving Node/Home Agent
RAM Random Access Memory
ROM Read Only Memory
TDMA Time Division Multiple Access
URL Uniform Resource Locator
WAN Wide Area Network Embodiments of the present invention may be embodied as, among other things: a method, system, or computer-program product.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information, such as computer storage media. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Illustrative Operating Environment

As stated above, the embodiments of the present invention may be, among other things: a method, system, or computer-program product that is implemented as software, hardware or a combination of the two, or as computer-readable media having computer-usable instructions embodied thereon. In these embodiments, an exemplary operating environment may be as simple as a single computing device. Examples of computing devices that may be suitable for use with the invention include, but are not limited to, personal computers, server computers, handheld or laptop devices, multiprocessor systems, microprocessor-based systems, set top boxes, programmable consumer electronics, network personal computers (PCs), minicomputers, and mainframe computers.

Figure 1:
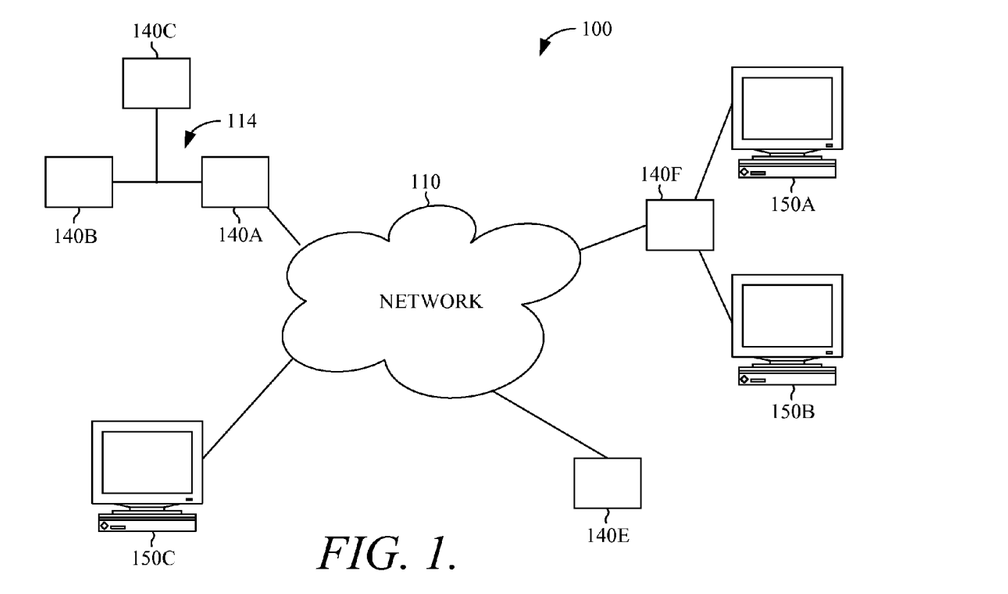
FIG. 1 is a drawing of an illustrative environment in which an embodiment of the present invention may operate.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C which communicate with each other via LAN 114, servers 140E and 140F all of which communicate with each other via network 110. Operating environment 100 is merely an example of one suitable networking environment and is not intended to suggest any limitation as to the scope of use or functionality of embodiments of the present invention. Neither should operating environment 100 be interpreted as having any dependency or requirement related to any single component or combination of components illustrated therein.

The client computing devices 150A, 150B, and 150C are conFIG.d for storing and/or processing computer-executable instructions and computer-readable data. By way of example only and not limitation, the client computing devices 150A, 150B, and 150C may be a personal computer, desktop computer, laptop computer, handheld device, cellular phone, consumer electronic, digital phone, smart phone, PDA, or the like. It should be noted that embodiments are not limited to implementation on such computing devices.

Network 110 might include a computer network or combination thereof. Examples of networks configurable to operate as network 110 include, without limitation, a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 may also comprise subsystems that transfer data between servers or computing devices. For example, network 110 may also include a point-to-point connection, the Internet, an Ethernet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, without limitation, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement embodiments of the present invention.

It will be understood by those of ordinary skill in the art that operating environment 100 is merely exemplary. While the servers 140A-F are illustrated as single boxes, one skilled in the art will appreciate that they are scalable. For example, the server 140C may, in actuality, include multiple boxes in communication. The single unit depictions are meant for clarity, not to limit the scope of embodiments in any form.

Figure 2:
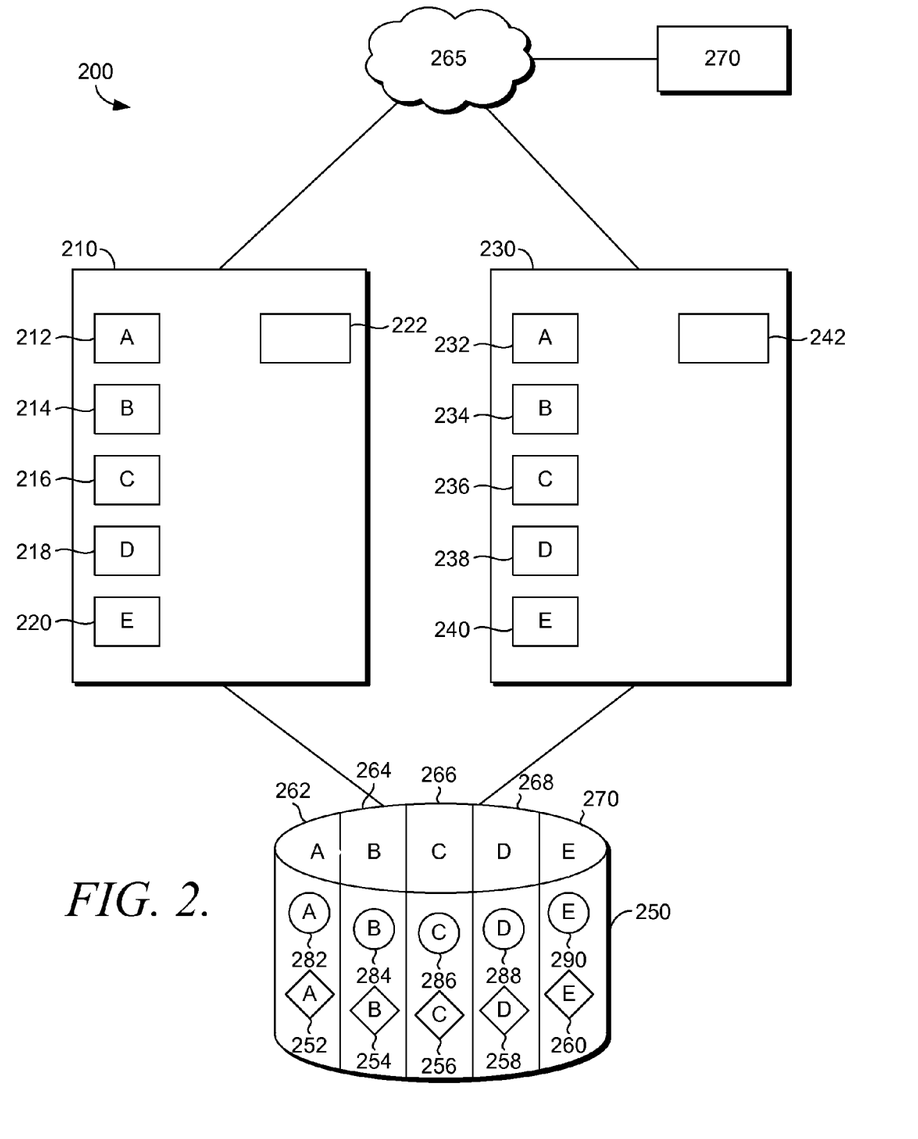
FIG. 2 illustrates a failover computing environment, according to an embodiment of the present invention.

Turning now to FIG. 2, a block diagram depicting exemplary computing system architecture 200, which is suitable for locating and monitoring a file log, is shown in accordance with an embodiment of the present invention. The exemplary computing system architecture 200 is merely an example and is not intended to suggest any limitation as to the scope of use or functionality of embodiments of the present invention.

Neither should the exemplary computing system architecture 200 be interpreted as having any dependency or requirement related to any single component or combination of components illustrated therein.

Exemplary computing system architecture 200 includes computing device 210 and computing device 230. Computing device 210 includes queue manager A 212, queue manager B 214, queue manager C 216, queue manager D 218, queue manager E 220 and monitoring component 222. Computing device 230 includes queue manager A 232, queue manager B 234, queue manager C 236, queue manager D 238, queue manager E 240, and monitoring component 242. Data store 250 includes directory location A 262, directory location B 264, directory location C 266, directory location D 268, and directory location E 270. Directory location A 262 includes core-configuration file A 252 and file log A 282. Directory location B 264 includes core-configuration file B 254 and file log B 284. Directory location C 266 includes core-configuration file C 256 and file-log C 286. Directory location D 268 includes core-configuration file D 258 and file log D 288. Directory location E 270 includes core-configuration file E 260 and file log E 290. Computing system architecture 200 also includes network 265, and enterprise response component 270. Exemplary computing system architecture 200 may reside in a distributed computing environment that includes multiple computing devices coupled with one another via one or more networks, for example, operating environment 100 described with reference to FIG. 1.

Computing device 210 and computing device 230 could be similar to servers 140A-F described with reference to FIG. 1. Similarly, network 265 could be similar to network 110 described with reference to FIG. 1. Computing devices 210 and 230 may share a single virtual IP address. Communications received at the virtual IP address from network 265 could then be routed to the intended destination on either computing device 210 or computing device 230.

The letter associated with a queue manager is intended to show the functions the queue manager is capable of performing. For example, queue manager A 212 and queue manager A 232 are both capable of performing the functions A. The functions performed by a queue manager will be explained in more detail subsequently. Queue manager A 212 and queue manager A 232 form a failover pair. One of the two queue managers is the primary queue manager and the other is the backup queue manager. When the primary queue manager fails the backup queue manager takes over the functions that were being performed by the primary queue manager. Each queue manager on computing device 210 is paired with a queue manager on computing device 230. This setup is referred to as a clustered failover environment, since each queue manager will failover to a backup queue manager if it experiences a problem.

The queue managers are part of a messaging-middleware application that is configured to transfer information between two or more applications in the form of messages. The queue managers manage queues that are each used to hold the messages sent between applications. Examples of commercially available messaging-middleware applications (a.k.a. message-oriented middleware) include IBM's WebSphere® MQ (formerly MQ Series®), Fiorano's MQ, Oracle Advanced Queuing (AQ), and Microsoft's MSMQ. The messaging-middleware application can be any application that uses queues to transfer messages from one application to another. For example, information from a front-end application is formed into one or more messages. These messages from the front-end application are placed in a sending queue that may be managed by one of the queue managers and transferred into a receiving queue that may be managed by a different one of the queue managers. A back-end program retrieves the message from the receiving queue. The message is transmitted through channels within the messaging-middleware application. In this example, the front-end program and the backend program could be located on any computing device communicatively coupled to the one or more computers on which the queue managers reside. A messaging-middleware client may reside on both of the computing devices on which the front-end and back-end programs reside to allow interaction with the messaging-middleware application.

In a clustered failover computing environment, a primary queue manager has a backup queue manager that is ready to handle message traffic if the primary queue manager has difficulties managing the message traffic. As explained previously, the primary queue manager and the backup queue manager are designated with the same letter. Thus, the queue manager A 212 and queue manager A 232 are a primary and backup pair of queue managers. Similarly, queue manager B 214 and queue manager B 234 are a primary and backup pair of queue managers. As described previously, a queue transfers messages between two programs. The primary queue manager manages queue instances that transfer the same type of message between the same two programs as the queue instances managed by the backup queue manager. Thus, if eight primary queue instances are managed by a primary queue manager, then eight backup queue instances would exist and be managed by a backup queue manager. A single queue manager may manage thousands of queues.

The primary and backup queue managers may be essentially the same. For example, queue manager A 212 may manage a primary queue instance and queue manager A 232 may manage a backup queue instance. Both the primary queue instance and backup queue instance receive the same type of messages sent between the same two applications. Only one of the queue instances and associated queue manager is active at a time. Thus, the primary and backup queue managers receive the same types of messages sent between the same applications, but the primary and backup queue instances are not both receiving messages at the same time.

The queue instances within the messaging-middleware application are described by a series of attributes. Each attribute has an associated value or setting. For example, one attribute could be a queue name and the associated setting could be "SprintBillinginfo1." Some attributes are preset, while other attributes measure current conditions within the queue and change over time. For example, the queue name attribute is preset, but the current queue depth attribute changes based on the number of messages in the queue. Queue depth is a measure of data in the queue at a particular time. Throughout this disclosure preset attributes will be associated with settings, and attributes that are based on queue conditions are associated with attribute values. The primary attribute settings and values that are involved in embodiments of the present invention include a message-in value, a message-out value, a reset time interval setting, an active application interface value, and a priority setting. Many other attributes may be used to describe a queue and may be accessed or modified in embodiments of the present invention.

Monitoring components 222 and 242 may be configured to monitor queues, queue managers, and file logs associated with queue managers for upset conditions that may require corrective actions. Examples of commercially available monitoring components include HP Openview®, Q Pasa!® by MQSoftware, Candle's PathWAI, and BMC Patrol. The monitoring components 222 and 242 may retrieve, store, and evaluate queue values periodically to ascertain whether an upset condition is present. For example, the file usage of the file log could be retrieved periodically. The file usage is the amount of data within the file log. The file log may be allocated a finite amount of data storage. Having retrieved the current file usage, the current file usage may be evaluated against threshold values within the monitoring components 222 and 242. The monitoring components 222 and 242 may generate an alarm or incident message if the current file usage is outside of normal operating conditions.

The monitoring components 222 and 242 may perform one or more calculations with the one or more attribute values to arrive at a value that is compared against a threshold. For example the monitoring components 222 and 242 may calculate the message throughput by dividing the outgoing messages during a period of time by the incoming messages during the period of time. The message throughput may then be compared against a threshold throughput and an incident message generated if the message throughput is within a cautionary range.

The monitoring components 222 and 242 also may be configured to generate and transmit notifications describing potential problems within a queue or queue manager. A problem may be indicated when one or more attribute values or calculated values fall outside of a normal operating range. In one embodiment, the information about the potential problem is transmitted to enterprise response component 270. In another embodiment, the monitoring components 222 and 242 directly notify a designated responder or other component about the potential problem.

Enterprise response component 270 is configured to coordinate a response to a problem detected in a queue or queue manager. The enterprise response component 270 may receive information regarding a malfunction from monitoring components 222 and 242 or another source. Upon receiving notification of a malfunction, the enterprise response component may page a designated responder to investigate the upset condition. A designated responder may be an individual person or group of people given responsibility to fix upset conditions within certain queues. In another embodiment, the designated responder may be a computer application that takes corrective actions, such as a service agent (not shown).

The data store 250 is configured for storing information related to a queue manager including historical performance data, file logs, and configuration files. The core-configuration files stored in data store 250 include core-configuration file A 252, core-configuration file B 254, core-configuration file C 256, core-configuration file D 258, and core-configuration file E 260. A core-configuration file contains information necessary to configure a queue manager for operation. In a failover cluster environment, only an active queue manager has access to the corresponding core-configuration file. Access to a core-configuration file may be managed by a component that controls the failover functionality of the various queue managers. A core-configuration file knows the directory location of a file log associated with its queue manager. The queue manager uses the file log to backup persistent messages. Persistent messages are those designated for backup in case the persistent message is lost, damaged, corrupted, or otherwise unavailable.

The letter after each directory location corresponds to the pair of queue managers to which the directory location is allocated. Each directory location includes, at least, a corresponding core-configuration file and a file log. For example, directory location A 262 is utilized by queue manager A 212 and queue manager A 232. The contents of directory location A 262 are also utilized by queue manager A 212 and queue manager A 232. For example, core-configuration file A 252 and file log A 272 are utilized by queue manager A 212 and queue manager A 232.

The letter after the core-configuration files in FIG. 2 corresponds to the functions performed by the queue manager with which the individual core-configuration file is associated. For example, core-configuration file B 254 is associated with queue manager B 214 and queue manager B 234. At any give time, either queue manager B 214 or queue manager B 234 will have access to core-configuration file B 254. Queue manager B 214 and queue manager B 234 may not both have access to core-configuration file B 254 at the same time.

Figure 3:
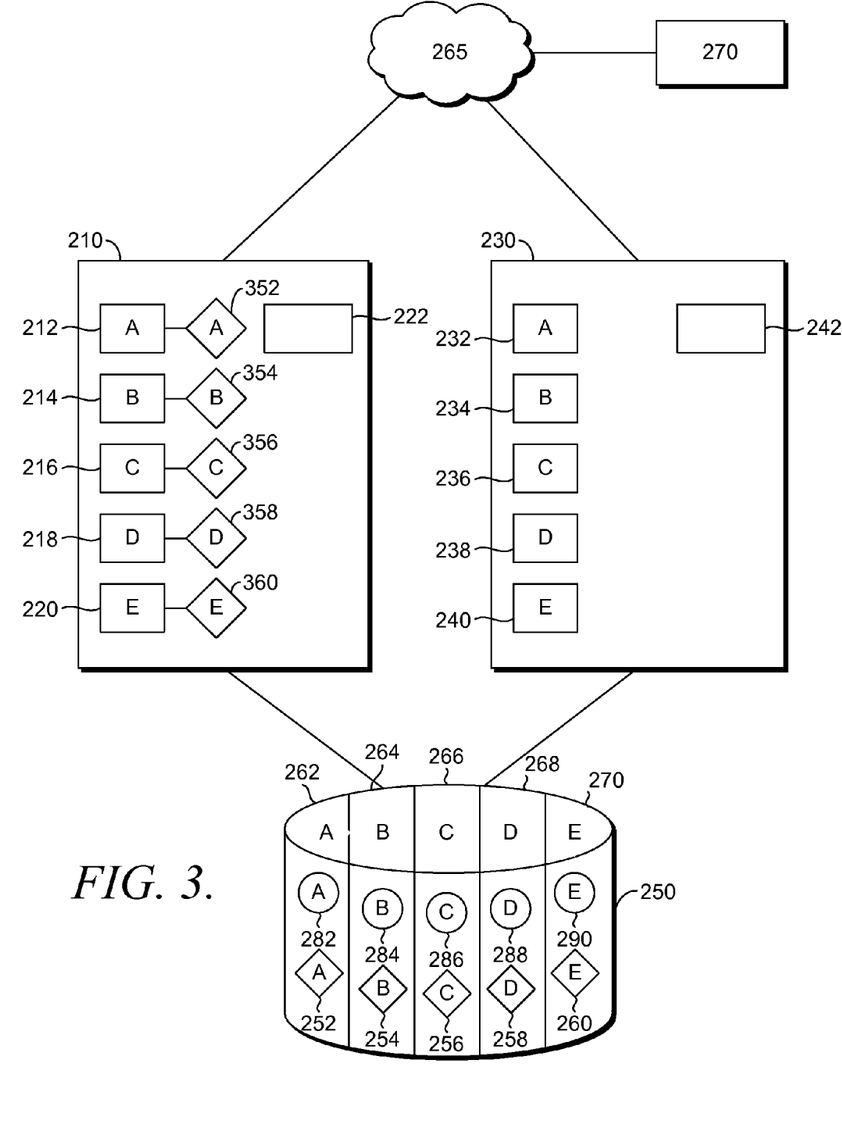
FIG. 3 illustrates core-configuration files mounted to active queue managers, in accordance with an embodiment of the present invention.

Turning now to FIG. 3, the mounting of core-configuration files to active queue managers is illustrated, in accordance with an embodiment of the present invention. Computing device 210 and computing device 230, have been described previously with reference to FIG. 2. Similarly, the queue managers (queue manager A 212, queue manager B 214, queue manager C 216, queue manager D 218, queue manager E 220, queue manager A 232, queue manager B 234, queue manager C 236, queue manager D 238, queue manager E 240) and monitoring components 222 and 242 have been described previously with reference to FIG. 2. Data store 250, and the contents of data store 250, network 265 and enterprise response component 270 have also been described previously with reference to FIG. 2.

In FIG. 3, queue manager A 212, queue manager B 214, queue manager C 216, queue manager D 218, and queue manager E 220 are all actively managing queue instances. As described previously, each active queue manager requires access to its corresponding core-configuration file to function. Each of the active queue managers is shown with a corresponding core-configuration file mounted to its file directory. Core-configuration file A 352 is mounted to the file directory associated with queue manager A 212. Core-configuration file B 354 is mounted to the file directory associated with queue manager B 214. Core-configuration file C 356 is mounted to the file directory associated with queue manager C 216. Core-configuration file D 358 is mounted to the file directory associated with queue manager D 218. Core-configuration file E 360 is mounted to the file directory associated with queue manager E 220. Core-configuration files are not mounted to the queue managers installed on computing device 230 because none of those queue managers are active. Queue manager A 212, queue manager B 214, queue manager C 216, queue manager D 218, and queue manager E 220 each would also have access to their corresponding directory location and file log located on data store 250. Though not shown, the directory location and file log may also be mounted to a directory location associated with a queue manager.

Mounting or mapping the core-configuration file to a queue manager gives the queue manager access to the core-configuration file. The core-configuration files may not actually be moved to computing device 210. The depiction of core-configuration files on computing device 210 illustrates that the queue managers on computing device 210 each have access to their corresponding core-configuration file. By mounting the core-configuration file to the file directory associated with the queue manager, the queue manager can access the core-configuration file. Once the core-configuration file is mounted to the file directory associated with the queue manager, the core-configuration file can be accessed by other components with access to the queue manager's file directory. For example, monitoring component 222 may access the file directories associated with each queue manager installed on computing device 210, and by extension can access a core-configuration file mounted to a file directory associated with the queue manager. The queue managers on computing device 210 may be described as the primary queue-managers. The queue-managers on computing device 230 may be described as the backup queue managers. Core-configuration files may be mounted to a file directory by a component (not shown) that managers the failover functionality of the queue managers on computing devices 210 and 230. Upon switching between queue managers, the core-configuration file is unmounted from the file directory associated with a primary queue manager and mounted to the corresponding file directory associated with the backup queue manager.

Figure 4:
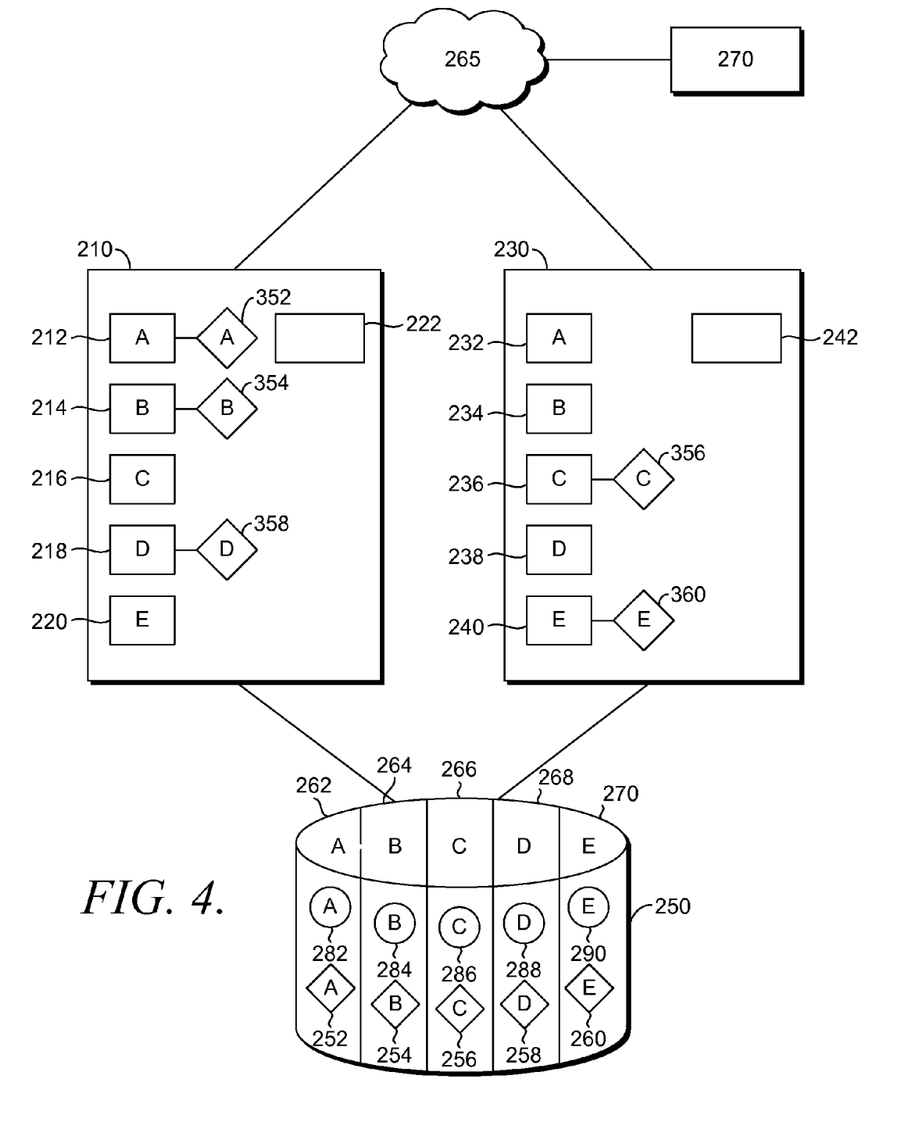
FIG. 4 illustrates core-configuration files mounted to active queue managers, in accordance with an embodiment of the present invention.

Turning now to FIG. 4, the distribution of active queue managers between two different computing devices is illustrated, in accordance with an embodiment of the present invention. Computing device 210 and computing device 230, have been described previously with reference to FIG. 2. Similarly, the queue managers (queue manager A 212, queue manager B 214, queue manager C 216, queue manager D 218, queue manager E 220, queue manager A 232, queue manager B 234, queue manager C 236, queue manager D 238, queue manager E 240) and monitoring components 222 and 242 have been described previously with reference to FIG. 2. Data store 250, core-configuration file A 252, core-configuration file B 254, core-configuration file C 256, core-configuration file D 258, core-configuration file E 260, network 265, and enterprise response component 270 have also been described previously with reference to FIG. 2

In contrast to FIG. 3, queue manager C 216 and queue manager E 220 no longer have corresponding core-configuration files mounted to their file directories. In one embodiment, queue manager C 216 and queue manager E 220 are deactivated because they experienced a failure. For the purpose of this illustration, the reason why the queue managers have failed is not important. Upon failing, the core-configuration file is mounted to the file directory association with their backup queue managers. In this case, queue manager C 236 is the backup queue manager to queue manager C 216 and queue manager E 240 is the backup queue manager for queue manager E 220. Core-configuration file C 356 is mounted to the file directory associated with queue manager C 236. Similarly, core-configuration file E 360 is mounted on the file directory associated with queue manager E 240. Queue manager C 236 and E 240 each would also have access to their corresponding directory location and file log located on data store 250. Though not shown, the directory location and file log may also be mounted to a directory location associated with a queue manager.

As in FIG. 3, core-configuration file A 352 is mounted to the file directory associated with queue manager A 212. Core-configuration file B 354 is mounted on the file directory associated with queue manager B 214. And, core-configuration file D 358 is mounted on the file directory associated with queue manager D 218. Queue manager A 212, queue manager B 214, and queue manager D 218 each would also have access to their corresponding directory location and file log located on data store 250. Though not shown, the directory location and file log may also be mounted to a directory location associated with the active queue manager.

FIG. 4 illustrates that, in a cluster failover environment, queue managers may be active on two different computing devices. However, this is just one embodiment. In other embodiments, all of the queue managers on a computing device may failover simultaneously to queue managers on a different computing device. As described previously, the corresponding backup and primary queue manager on either one, but not both of, computing devices 210 and 230 would be operating at any given time.

Figure 5:
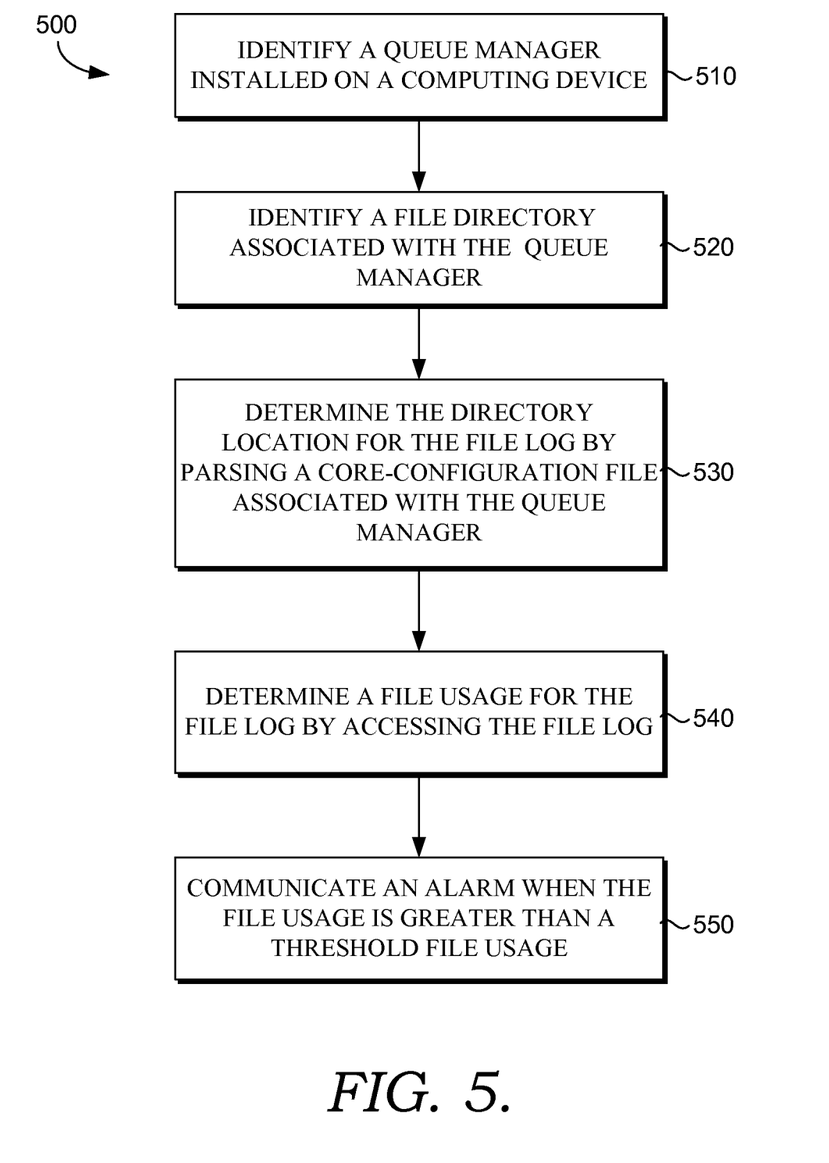
FIG. 5 is a flow diagram in which a method of discovering a directory location for a file log associated with a queue manager is described, according to an embodiment of the present invention.

Turning now to FIG. 5, a method of 500 of discovering a directory location for a file log associated with a queue manager is shown, in accordance with an embodiment of the present invention. The queue manager may be operating in a failover environment that may include at least two computing devices and a data store that is accessible to the at least two computing devices. The computing devices and data store may be similar to those described with reference to FIG. 2. At step 510, a queue manager is identified. The queue manager is installed on the computing device. In one embodiment, the identified queue manager is one of a plurality of queue managers installed on the computing device. The queue manager may be identified by accessing a top-level-configuration file used by the messaging-middleware software, of which the identified queue manager is a part. The top-level-configuration file may include a list of all of the queue managers installed on the computing device.

At step 520, a file directory associated with the queue manager is identified. In one embodiment, the file directory associated with the queue manager is identified by accessing the top-level-configuration file, which was described previously with reference to step 510. The top-level-configuration file may include file directory information for each queue manager installed on the computing device. In one embodiment, each queue manager installed on the computing device has a file directory. The file directory associated with the queue manager may include files stored locally on the computing device and files stored on a separate computing device, such as a data store. As described previously, some of the files in the file directory may be mounted to the file directory associated with the queue manager when the queue manager becomes active.

At step 530, the directory location for the file log is determined by parsing a core-configuration file associated with the queue manager. As described previously, the core-configuration file is necessary for the queue manager to operate. The core-configuration file may be a QM.INI file. The core-configuration file helps facilitate backing up persistent messages to the file log. The file log is used by the queue manager to store backup copies of persistent messages. Thus, the core-configuration file knows the directory location for the file log. In one embodiment, the file log is physically located on the data store and is shared by the primary queue manager and the backup queue manager.

At step 540, a file usage is determined for the file log by accessing the file log through the directory location. The file usage may be measured in bytes of information, the number of messages, or any other format suitable for conveying the amount of data within the file log. In one embodiment, the file log is allocated a certain amount of memory on the data store. If the file log becomes full, the queue manager may malfunction when it receives a persistent message that needs to be backed up. In one embodiment, the file usage in the file log is determined by automatically executing a DF-K command. The DF-K. command automatically returns the file usage.

At step 550, an alarm is communicated if the file usage is greater than a threshold file usage. The alarm may be sent to an enterprise response component that pages a designated responder. As described previously, a designated responder may be a person or a program with responsibility for fixing errors and upset conditions within the messaging-middleware environment. In another embodiment, the alarm may be generated and sent directly to a designated responder. In one embodiment, the method 500 is performed by a monitoring agent installed on the computing device. Method 500 may also be performed by every monitoring agent within a failover environment. In one embodiment, method 500 is repeated for each queue manager installed on the computing device. In addition, method 500 may be performed before each monitoring cycle, thereby ensuring that each file log is monitored every monitoring cycle.

Figure 6:
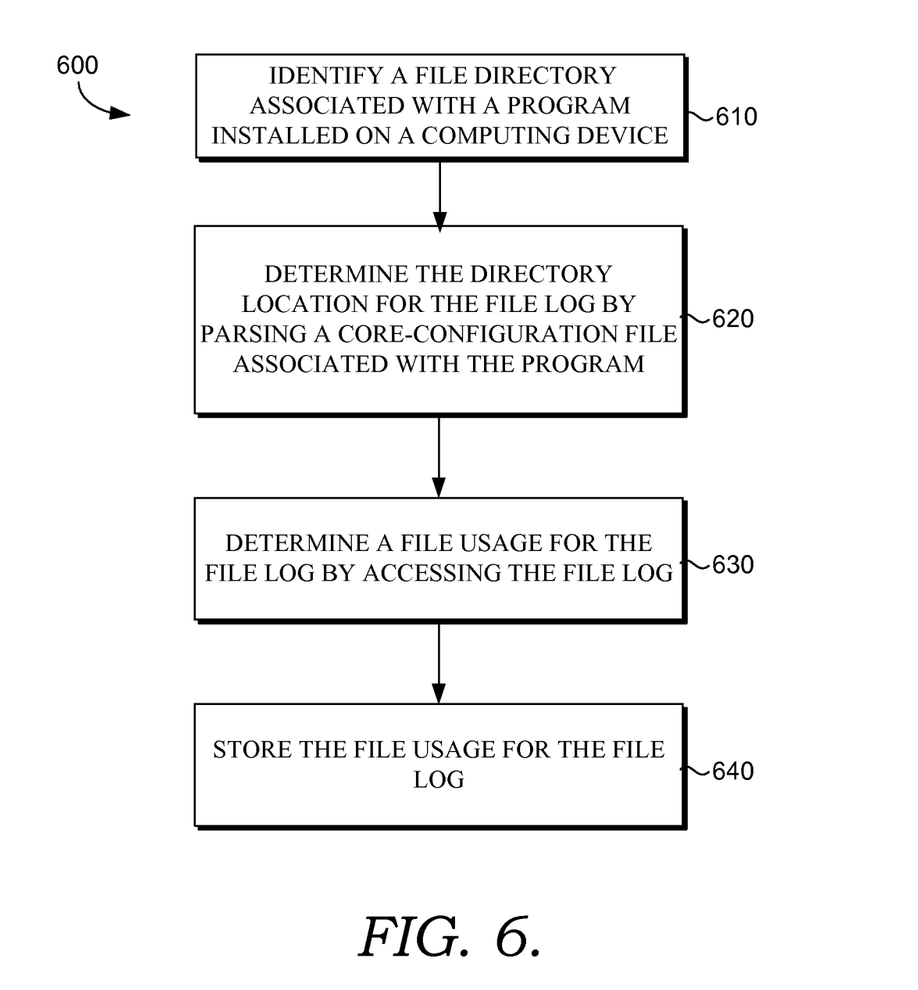
FIG. 6 is a flow diagram in which a method of determining a file usage level for a file log used by a program installed on the computing device is described, according to an embodiment of the present invention.

Turning now to FIG. 6, a method 600 of determining a file usage level for a file log used by a program installed on the computing device is shown, in accordance with an embodiment of the present invention. The computing device may be similar to the computing device 210 shown in FIG. 2. At step 610, a file directory associated with a primary program is identified. The primary program may be one of a plurality of programs installed on the computing device. The primary program may be part of a failover cluster that includes at least one pair of programs that are capable of performing the same functions. The at least one pair of programs includes the primary program installed on the computing device and a backup program installed on a different computing device. The backup program is activated when the primary program is deactivated. As described previously, the programs may share the file log because only one of the two programs is active at any given time. In one embodiment, the file directory is identified by accessing a top-level-configuration file that governs the primary program and other similar programs operating on the computing device.

At step 620, a directory location is determined for the file log by parsing a core-configuration file associated with the primary program. The directory location may be in a data store that is maintained separately from the computing devices on which the primary program and the backup program are installed. As described previously, the core-configuration file knows the directory location, because the queue manager associated with the core-configuration file writes messages to the file log.

At step 630, a file usage is determined for the file log by accessing the file log through the file directory location determined from the core configuration file. In one environment, the primary program is a queue manager that is part of a messaging-middleware program. At step 640, the file usage is stored. The stored file usage may be accessed by a monitoring component that compares the stored file usage, with a threshold value. If the file usage exceeds a threshold value, then an alarm may be generated and communicated to a designated responder.

Figure 7:
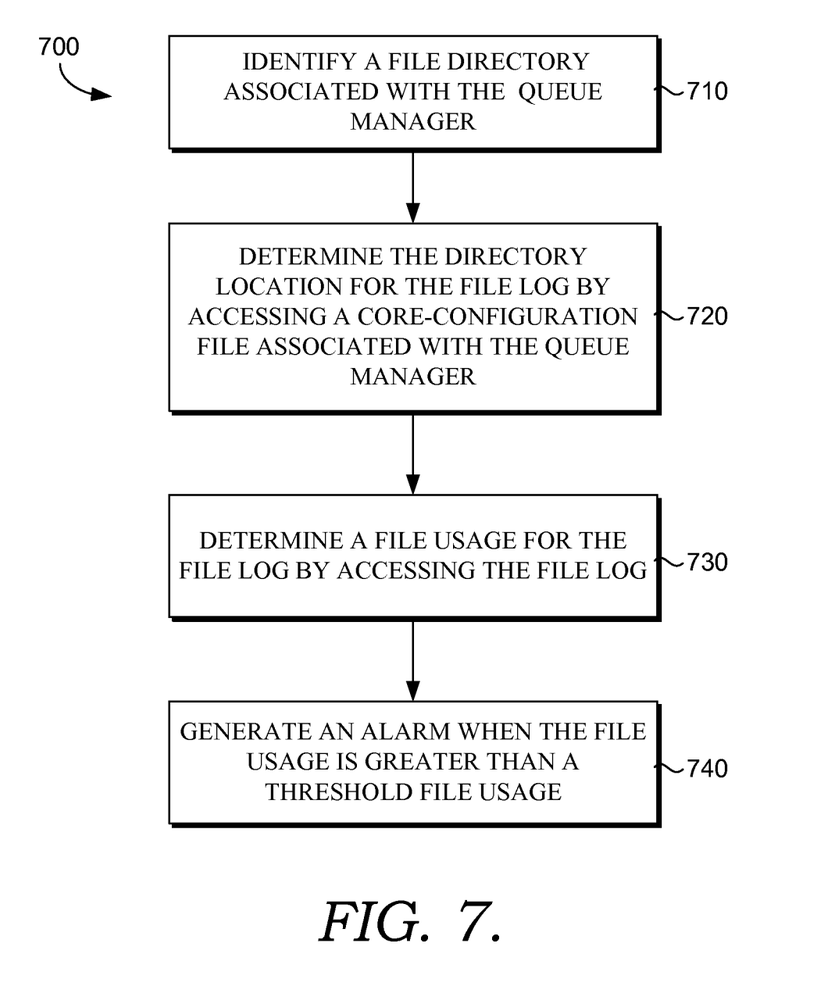
FIG. 7 is a flow diagram in which a method of identifying a directory location for a file log associated with a queue manager is described, according to an embodiment of the present invention.

Turning now to FIG. 7, a method 700 of identifying a directory location for a file log associated with a queue manager is shown, in accordance with an embodiment of the present invention. At step 710, a file directory for the queue manager is identified. The queue manager may be installed on a first computing device and be part of a failover cluster that includes at least one pair of queue managers. The pair of queue mangers is both capable of performing the same functions. The at least one pair of queue managers includes the identified queue manager and a backup queue manager installed on a second computing device. The at least one pair of queue managers requires access to a core-configuration file located in a data store to operate. In one embodiment, both queue managers backup messages to the same file log. The file log may also be located on the data store.

At step 720, the directory location for the file log is determined. The directory location may be determined by accessing the core-configuration file. As described previously, the queue manager needs the core-configuration file to operate. The file log is used by the queue manager to store backup copies of persistent messages. A message may be persistent, because it is designated as persistent by a sending application. In general, the sending application should designate important messages as persistent.

At step 730, a file usage for the file log is determined by accessing the file log through the directory location. At step 740, an alarm is generated when the file usage is greater than a threshold amount. The threshold usage may be a percentage of the memory allocated to the file log. In one embodiment, the percentage is 50%. In another embodiment, the threshold amount is an amount of data.

Many different arrangements of the various components depicted, as well as components not shown, are possible without departing from the spirit and scope of the present invention. Embodiments of the present invention have been described with the intent to be illustrative rather than restrictive. Certain features and subcombinations are of utility and may be employed without reference to other features and subcombinations and are contemplated to be within the scope of the claims. Not all steps listed in the various FIGS. need be carried out in the specific order described.

The invention claimed is:

1. One or more non-transitory computer-readable media having computer-executable instructions embodied thereon for performing a method of discovering a directory location for a file log associated with a queue manager, the method comprising:

identifying a primary queue manager and a backup queue manager, which are installed on a first computing device and a second computing device, respectively, as a failover cluster, wherein the primary queue manager and the backup queue manager are part of a messaging-middleware application configured to transfer information between two or more applications;

identifying a first file directory associated with the primary queue manager and a second file directory associated with the backup queue manager;

mounting a core-configuration file to the first file directory to grant the primary queue manager access to the core-configuration file such that the backup queue manager lacks access to the core-configuration file, wherein the core-configuration file comprises information to configure the primary queue manager and the backup queue manager for operation when the core-configuration file is associated with the primary queue manager or the backup queue manager;

determining a directory location for a file log by parsing the core-configuration file, wherein the file log is used by one of the queue managers to store backup copies of persistent messages, thereby allowing the persistent messages to be recovered;

determining a file usage for the file log by accessing the file log through the directory location determined from the core-configuration file;

communicating an alarm when the file usage is greater than a threshold file usage; and dismounting the core-configuration file from the first file directory and mounting the core-configuration file to the second file directory when the primary queue manager experiences a failure such that the backup queue manager has access to the core-configuration file and the primary queue manager lacks access to the core-configuration file.

2. The media of claim 1, wherein the queue managers and the file directories are identified by accessing a top-level-queue-manager-configuration file that includes a list of queue managers installed on the computing device and file-directory information for each of the queue managers.

3. The media of claim 1, wherein the method further includes repeating the steps of, identifying the primary queue manager and the backup queue manager, identifying the first file directory associated with the primary queue manager and the second file directory associated with the backup queue manager, mounting the core-configuration file to the first file directory, and determining the directory location for the file log by parsing the core-configuration file, wherein the repeating is performed for each of a plurality of queue managers and a plurality of file directories contained in a top-level-queue-manager-configuration file that includes a list of queue managers installed on the first computing device and file-directory information for each of the queue managers.

4. The media of claim 1, wherein the method further includes repeating the method of claim 1 before each monitoring cycle is performed by a monitoring agent.

5. The media of claim 1, wherein the method of claim 1 is performed by a monitoring agent that monitors functions of queue managers installed on the computing device.

6. The media of claim 1, wherein the file usage is determined by navigating to the directory location and automatically executing a df-k command on the file log, wherein the df-k command provides the file usage.

7. The media of claim 1, wherein the core-configuration file is a QM.INI file that is stored in the data store.

8. One or more non-transitory computer-readable media having computer-executable instructions embodied thereon for performing a method of determining a file usage level of a file log used by a program installed on a computing device, the method comprising:

identifying a file directory associated with a primary program that is one of a plurality of programs installed on the computing device, wherein the primary program is part of a failover cluster that includes at least one pair of programs that are capable of performing the same functions, wherein the primary queue manager and the backup queue manager are part of a messaging-middleware application configured to transfer information between two or more applications, wherein the at least one pair of programs includes the primary program installed on the computing device and a backup program installed on a different computing device, wherein the backup program is activated when the primary program is deactivated, and wherein the at least one pair of programs utilize the file log for backup storage;

determining a directory location for the file log by parsing a core-configuration file associated with the primary program, wherein the core-configuration file comprises information to configure the primary queue manager and the backup queue manager for operation when the core-configuration file is mounted to the primary queue manager or the backup queue manager, and wherein the directory location is in a data store that is maintained separately from the computing device and the different computing device;

determining a file usage for the file log by accessing the file log through the directory location determined from the core-configuration file; and storing the file usage for the file log, wherein the core-configuration file is mounted to the file directory associated with the primary program when the primary program is active such that the backup program lacks access to the core-configuration file and when the primary program experiences a failure, dismounting the core-configuration file from the file directory associated with the primary program and mounting the core-configuration file to a second file directory associated with the backup program such that the backup program has access to the core-configuration file and the primary program lacks access to the core-configuration file.

9. The media of claim 8, wherein the file directory is identified by accessing a top-level-configuration file that includes a list of file directories associated with programs installed on the computing device.

10. The media of claim 8, wherein the method further includes identifying each program installed on the computing device by accessing a top-level-configuration file that includes a list of programs installed on the computing device and repeating the method of claim 8 for said each program.

11. The media of claim 10, wherein the method further includes:

generating an alarm when the file usage is above a threshold file usage; and communicating the alarm to a designated responder.

12. The media of claim 8, wherein the plurality of programs are queue managers that manage queues in a messaging-middleware program.

13. The media of claim 8, wherein the file log is physically located in the data store.

14. The media of claim 13, wherein the file log is accessed through the directory location that is mounted to the file directory associated with the primary program when the primary program is active.

15. One or more non-transitory computer-readable media having computer-executable instructions embodied thereon for performing a method of identifying a directory location for a file log associated with a queue manager, the method comprising:

identifying a first file directory for a primary queue manager installed on a first computing device and a second file directory for a backup queue manager installed on a second computing device, wherein the queue managers are part of a failover cluster that includes at least one pair of queue managers capable of performing the same functions, wherein the primary queue manager and the backup queue manager are part of a messaging-middleware application configured to transfer information between two or more applications, wherein the at least one pair of queue managers includes the primary queue manager and the backup queue manager, and wherein the at least one pair of queue managers requires access to a core-configuration file located in a data store to operate;

mounting the core-configuration file to the first file directory to grant the primary queue manager access to the core-configuration file such that the backup queue manager lacks access to the core-configuration file and to grant the primary queue manager access to the file log, wherein the core-configuration file comprises information to configure the primary queue manager and the backup queue manager for operation when the core-configuration file is mounted to the primary queue manager or the backup queue manager;

determining the directory location for the file log by parsing the core-configuration file, wherein the file log is used by a queue manager to store backup copies of persistent messages, thereby allowing the persistent messages to be recovered;

determining a file usage for the file log by accessing the file log through the directory location;

generating an alarm when the file usage is greater than a threshold amount;

dismounting the core-configuration file from the first file directory and mounting the core-configuration file to the second file directory when the primary queue manager experiences a failure such that the backup queue manager has access to the file directory and the primary queue manager lacks access to the core-configuration file.

16. The media of claim 15, wherein the file log is located in the data store.

17. The media of claim 16, wherein the file log is accessed in the data store through the directory location by the primary queue manager when the core-configuration file is mounted to the first file directory and by the backup queue manager when the core-configuration file is mounted to the second file directory.

18. The media of claim 17, wherein the threshold amount is a percentage of memory allocated to the file log.

19. The media of claim 18, wherein the percentage is about 50%.

* * * * *